United States Patent [19]

Dach et al.

[11] Patent Number: 4,817,462
[45] Date of Patent: Apr. 4, 1989

[54] PLANETARY SHIFT GEAR UNIT

[75] Inventors: Hans-Jorg Dach, Friedrichshafen; Anton Ott, Tettnang, both of Fed. Rep. of Germany

[73] Assignee: Zahnradfabrik Friedrichshafen AG, Friedrichshafen, Fed. Rep. of Germany

[21] Appl. No.: 122,561

[22] Filed: Nov. 16, 1987

Related U.S. Application Data

[63] Continuation of Ser. No. 826,481, Jan. 17, 1986, abandoned.

[30] Foreign Application Priority Data

May 26, 1984 [WO] PCT Int'l Appl. .................. PCT/EP84/00162

[51] Int. Cl.$^4$ ...................... F16H 37/00; F16H 57/10
[52] U.S. Cl. .......................................... 74/740; 74/762
[58] Field of Search ........................ 74/740, 762, 770

[56] References Cited

U.S. PATENT DOCUMENTS

| | | | |
|---|---|---|---|
| 2,926,543 | 3/1960 | Holdeman et al. | 74/869 |
| 3,031,901 | 5/1962 | Simpson | 74/770 |
| 3,209,618 | 10/1965 | Schwab | 74/688 |
| 4,007,648 | 2/1977 | Bookout | 74/763 |
| 4,043,223 | 8/1977 | Ohnuma et al. | 74/688 |
| 4,241,622 | 12/1980 | Kubo et al. | 74/740 |
| 4,406,179 | 9/1983 | Numazawa et al. | 74/740 |
| 4,512,212 | 4/1985 | Ishikawa | 74/762 X |
| 4,582,159 | 4/1986 | Suzuki | 74/740 |
| 4,602,522 | 7/1986 | Dörpmund | 74/762 X |

FOREIGN PATENT DOCUMENTS

| | | | |
|---|---|---|---|
| 1430843 | 1/1969 | Fed. Rep. of Germany | 74/740 |
| 1630849 | 3/1972 | Fed. Rep. of Germany . | |
| 2935361A1 | 3/1981 | Fed. Rep. of Germany . | |
| 2208489 | 6/1974 | France . | |
| 2486186 | 1/1982 | France . | |
| 2486186 | 1/1982 | France . | |
| 56-39346 | 4/1981 | Japan . | |
| 1137149 | 12/1968 | United Kingdom . | |
| 2017839 | 10/1979 | United Kingdom . | |
| 2023752 | 1/1980 | United Kingdom . | |
| 2062145 | 5/1981 | United Kingdom . | |

OTHER PUBLICATIONS

ATZ Automobiltechnische Zeitschrift 85 (1983) 6 The Development of ZF's HP 22 Four-Speed Automatic Transmission–Hansjörg Dach.
SAE Technical Paper Series 820740, Toyota Computer Controlled Four-Speed Automatic Transmission, SAE-The Engineering Resource for Advancing Mobility Passenger Car Meeting, Troy, Michigan, Jun. 7-10, 1982.

*Primary Examiner*—Dirk Wright
*Attorney, Agent, or Firm*—Herbert Dubno

[57] ABSTRACT

A planet wheel speed change transmission for motor vehicles arrayed in groups with one basic drive and one group drive associated therewith in series, where the basic drive consists of a speed change transmission with fixedly coupled partial drive and a sequence of gear ratios decreasing in principle from first to highest gear, and the group drive is shifted only once during the entire shift sequence and the number of gears in the basic drive is increased by a single gear, with shift clutches, brakes and free-wheel mechanisms for the automatic shifting of at least four forward speeds, where the shifting of the group drive occurs between two of the gears of the basic drive, or where the group drive is speed-reducing and then shifting occurs also ahead of the first gear of the basic drive and the transmission ratio of the group drive, when it is shifted, is created in dependence upon the gear ratios in the adjacent gears of the basic drive.

6 Claims, 3 Drawing Sheets

| G.1 – G.4 | 180+190 | I – V |
|---|---|---|
| 2.41 | × 1.46 | = 3.53 |
| 1.37 | × 1.46 | = 2.00 |
| 1.37 | × 1.00 | = 1.37 |
| 1.00 | × 1.00 | = 1.00 |
| 0.74 | × 1.00 | = 0.74 |

| G.1 – G.4 | 180+190 | I – V |
|---|---|---|
| 2.41 | × 1.82 | = 4.39 |
| 2.41 | × 1.00 | = 2.41 |
| 1.37 | × 1.00 | = 1.37 |
| 1.00 | × 1.00 | = 1.00 |
| 0.74 | × 1.00 | = 0.74 |

PLANETARY SHIFT GEAR UNIT

This is a continuation of application Ser. No. 826,481, filed on Jan. 17, 1986, now abandoned.

CROSS REFERENCE TO RELATED APPLICATIONS

This application is a national phase application corresponding to PCT/EP85/00219 filed 11 May 1985 and based upon a prior filing under PCT in Luxembourg, No. PCT/EP/84/00162 of 26 May 1984.

BACKGROUND OF THE INVENTION

Planetary-gear speed-change transmissions are known, e.g. from ATZ 85 (1983) 6 pages 393 to 398, and from SAE Technical Paper Series No. 820740. Both transmissions consist of a three-speed coupling drive as basic drive, and a fourth speed, which is realized as overdrive, is achieved by means of a group drive arranged in series with the basic drive. These systems have the advantage that tried arrangements are retained in principle, and that the overdrive provided is derived from a simple gear train which is arranged as a group, i.e. a series of gauged drive.

The arrangement of the group drive ahead of the basic drive, as seen in the example of the SAE Technical Paper Series, or after it, as shown according to ATZ, is relevant only in connection with the layout of the drive elements, with both systems having respective advantages and disadvantages.

Four speed transmissions of this type have proven themselves in practice and offer, in conjunction with the arrangement of the fourth speed as overdrive and a torque converter with a bypass clutch, advantages especially with regard to fuel consumption. Also, the shiftability of such a transmission is good, because undesirable simultaneous shifting common with the conventional arrangement of groups in the basic and group drive is avoided by joining the fourth speed to the last speed of the basic drive.

It is a disadvantage that the adaption of the entire drive train is not sufficiently flexible with such a solution drive, and is insufficient with respect to the overall transmission ratio and number of speeds.

OBJECT OF THE INVENTION

It is, therefore, the object of the invention to better adapt a planetary gear speed change transmission to a variety of requirements especially in connection with number of speeds, overall gear ratio, their graduation in a better manner, without it being necessary to shift the basic and group drive simultaneously, and where the cost of such drive shall not be increased substantially.

SUMMARY OF THE INVENTION

According to the invention a planetary gear speed change transmission for motor vehicles is provided in groups with one basic drive and one group drive associated therewith in series. The basic drive consists of a speed change transmission with fixedly coupled partial drives and a sequence of gear ratios decreasing from first to highest gear. The group drive, effecting speed increase, is shifted only once during the entire shift sequence. The number of speeds in the basic drive is increased by a single speed and the transmission includes shift clutches, brakes and free wheeling devices for automatic shifting of at least four forward speeds.

According to the invention, more specifically, the group drive is shifted between two of the speeds of the basic drive and the gear ratio of the group drive is equal to or greater than that of the next lower speed with respect to the shifted speed in the basic drive and is smaller than or equal to the next gear ratio in the basic drive.

The group drive can effect a speed decrease and that the gear ratio when it is not connected to the first gear, is greater than or equal to that of the gear in the basic drive next lower to the engaged gear, and if applicable, smaller than or equal to the next higher gear ratio in the basic drive provided that it is connected to a speed lower than the highest.

Aside from the already known advantage of producing an additional overdrive by joining a group drive to the highest gear of a basic drive whose highest gear is a direct drive, for the most economical way of driving, it is also possible to place the additional gear between the gears of the basic drive, depending on requirements, and the desired overall gear ratio. This is an advantage especially when a gear ratio sequence decreasing in principle from the first to the highest gear is desired, and the basic drive already exhibits an overdrive.

If a group drive with speed reduction is provided, then it is possible to make the overall gear ratio especially high, without having to abandon the sequence of basic gear ratios decreasing from the highest to the lowest gear. The overall ratio in this case becomes greater as the group drive is shifted into play in the overall sequence. With the shifting of the group drive, e.g. in connection with the first gear of the basic drive, it is possible to increase the acceleration in the low gears substantially, in addition to providing a maximum possible increase of the overall gear ratio, so that in addition to the improvement of the adaptation in the drive train, it is possible to think of omitting an aid to acceleration, e.g. a torque converter.

The increase in overall transmission ratio is different depending on the gear of the basic drive with which the additional gear gained from the group drive is formed and shifted, so that an optimal adaptation is possible.

If the basic drive already exhibits an overdrive, then there results particularly advantageous conditions for the interpolation of the gear gained and shifted in the group drive between the gears of the basic drive so that the overall transmission ratio can be selected from a relatively large range and the shifted gear of the group drive can be placed between all gears of the basic drive and in the case of a speed reduction can also be placed ahead of the first gear in the basic drive. It is of course possible to provide a second overdrive which can be advantageous.

Since the gradation of the speed reducing gears in the basic drive is larger than the gradation between a direct drive gear and an overdrive, the overall transmission ratio can be increased in a particularly advantageous manner by providing the gear being shifted in the group drive in connection with the speed reducing gears of the basic drive.

According to a feature of the invention, a motor output shaft is connected on the one hand rotationally with a first input shaft via the pump and turbine of a torque converter and on the other hand to a second input shaft of the basic drive. The first input shaft is connectable selectively via clutches to the sun wheels of a reduced coupling drive or can be fixed by means of brakes or provided with a free wheel device. The second input shaft is connectable via a clutch with the planet carrier of reduced coupling drive. Additionally the planet carrier can be connected with a free wheel device, and can be immobilized via a further brake. The internal gears of the basic drive and the group drive which is realized as a simple gear train with a sun gear, a planet carrier and an internal gear are rigidly connected with one another and can also be connected to the sun wheel via a clutch. The latter can be immobilized by means of a free wheel device and a brake G and the input shaft which also carries an inductive sensor for the purpose of determining the speed of rotation is connected to the planet carrier of the group drive.

In the latter case, an already proven, automatically operating four-speed planet wheel change transmission, which already has an overdrive, is completed by means of a simple gear train which is speed reducing. In addition to the gain of a fifth speed at a gear ratio of the group drive of e.g. 1.82, that is toward speed reduction, an overall ratio of 4.39 is achieved. Considering the overdrive already present in the basic drive, the overall ratio is then 5.39.

According to another feature of the invention, a motor output shaft is connected to the pump of a torque converter. The torque converter also has a bypass clutch and the input shaft of the basic drive is connected with the turbine, or is connectable to the bypass clutch via a damping device. This bypass clutch is connectable to the sun wheels or the planet carrier of a reduced coupling drive selectively via clutches. Alternatively this bypass clutch can be immobilized via brakes or a free wheel device. The planet carrier is additionally connected to a free wheel device and can be immobilized by means of a further brake. The internal gear of the basic drive can be connected to the planet carrier of group drive, and the sun gear can be immobilized via a brake and connected via a clutch and a free wheel device with output shaft, which is connected to an internal gear of the group drive and is also equipped with an inductive sensor for the purpose of determining the speed of rotation.

Here there is provided parallel to the torque converter also a bypass clutch, which e.g. in the higher gears, by bypassing of this torque converter contributes to economical operation, since no more torque converter losses occur.

It is also possible to form two additional arrays of speeds, one with the direct drive and another with the geared speed of the group drive, so that e.g. in a five-speed drive parallel thereto, two additional four-speed arrays are available. These can likewise be preselected and arranged, e.g. as sporting type or fuel economical arrays. For sporting type operation, the direct drive would be utilized in the sense of the first embodiment described, and the speed reducing drive of the group drive with the coordinated speed of the group drive in the sense of the second embodiment.

A relatively large overall transmission ratio results particularly when the group drive is speed reducing and the gear obtained therefrom is shifted with the low gears of the basic drive, so that a torque converter for initial acceleration can be omitted, and e.g. a hydrodynamic acceleration and shifting aid can be applied.

It is also possible, as is well known, to bypass the hydrodynamic clutch after the initial acceleration and after each shifting procedure, in order to avoid loss of efficiency.

The highest possible overall transmission ratio can be achieved when the first gear of the planet wheel speed change transmission is formed with the first gear of the basic drive and the speed reducing gear of the group drive, and the higher gears originate exclusively with the gearing of the basic drive because the group drive drives directly, so that a damping device between the motor output shaft and the basic drive, e.g. arranged ahead of the group drive is sufficient. In this case a brake, e.g. of the basic drive or the group drive is adapted for initial acceleration. Brakes are therefore particularly well suited because a part of them is stationary and pressure lines are easier to locate, as compared to clutches.

The arrangement of the group drive with its axis parallel to the basic drive facilitates transverse installation in the vehicle.

With the planetary gear speed change transmission according to the invention, the adaption of the planetary gear speed change transmission to the most varied requirements is possible in an optimal manner. It is also possible to combine the basic drive having two input shafts with the group drive and a speed increase drive. Furthermore, a layout with only one damping device, between motor output shaft and basic drive, is conceivable in conjunction with a drive arrangement where the group drive is speed increasing and is shifted between the first and second gear.

SPECIFIC DESCRIPTION

Figure 1:
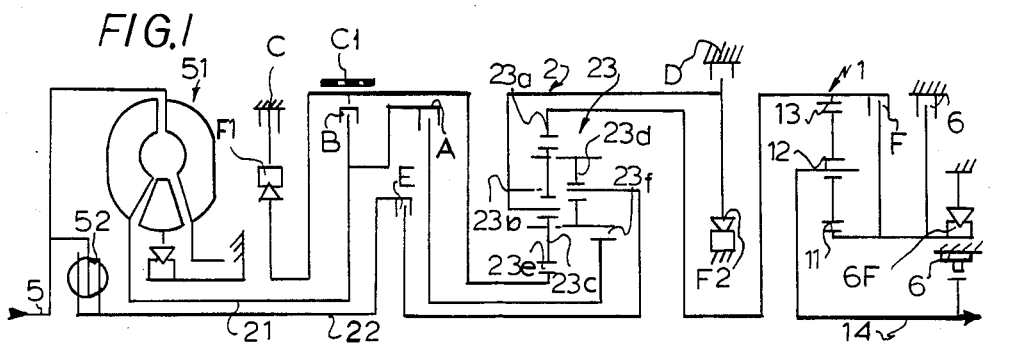
FIG. 1 is a diagram of a basic drive with a speed-reducing group drive, with a torque converter and two input shafts for the basic drive.

In FIG. 1, a known automatic transmission 2 is arrayed as basic drive, and a simple gear train as group drive 1. The motor output shaft 5 is connected rotationally via the pump and turbine of a torque converter 51 to the first input shaft 21 of the automatic transmission.

The shaft 5 is also connected via a damping device 52 with a second input shaft 22 of the basic drive 2.

The first input shaft 21, selectively via clutches A and B is connectable to the sun wheels of a speed-reducing coupling drive 23, whose sun gears can also be immobilized via brakes C and C1 or have a free-wheel mechanism F1.

The drive 23 is a planetary drive having a ring gear 23a connected with the ring gear 13 and a clutch F, a planet carrier 23b with two sets of planet gears 23c and 23d, and two sun gears 232e and 23f. The planet gears 23c mesh with both the ring gear 23a and the sun gear 23e, while planet gears 23d mesh with sun gear 23f.

The second input shaft 22 is connectable via clutch E with the planet carrier of the reduced coupling drive, which planet carrier is also connected with a free-wheel mechanism F2, and can be immobilized via a further brake D.

The ring gears of the basic drive 2 and the group drive 1 are solidly connected, where the group drive itself consists of a simple gear train with another planet carrier 12 (whose planets mesh with the ring gear 13) and a sun gear 11. In addition, the ring gears of the basic drive and the group drive can be connected to sun gear 11 via clutch F. Furthermore, the sun gear 11 is connected with a free-wheel mechanism $G_F$ as well as with a brake G. The output shaft 14, upon which in addition as inductive sensor 6 for the determination of the speed of rotation is arranged, has a solid connection with planet carrier 12.

Figure 2:
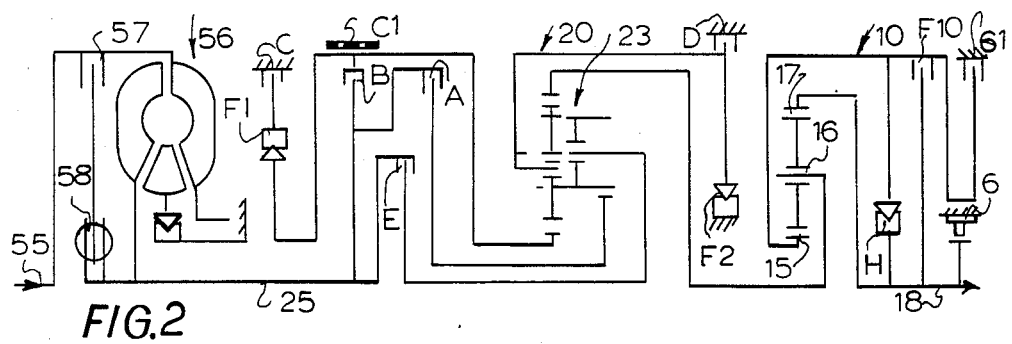
FIG. 2 is a diagram of a basic drive with a speed-increasing group drive and only one input shaft for the basic drive, where in the torque converter a bypass clutch is also provided.

FIG. 2 corresponds in principle to FIG. 12, except that the simple gear train of group drive 10, due to a coupling of the planet carrier 16 with the basic drive 10, is speed increasing. Further, the torque converter 56 is provided with a bypass clutch 57 and the motor output shaft 55 is connected with the basic drive 20 only via an input shaft 25. The various kinematic connections are as follows:

The motor output shaft 55 is connected to the pump of the torque converter 56 and the torque converter further has the bypass clutch 57 previously mentioned. The input shaft 25 of the basic drive 20 is connected with the turbine or is connectable to the motor output shaft via a damping device 58 and the bypass clutch 57.

The input shaft (FIG. 2) is connectable, selectively via clutches A, B, E, with the sun gears or the planet carriers, respectively, of a speed-up reduced coupling drive 23, or it can be immobilized via brakes C, C1 or a free-wheel mechanism F1. The planet carrier is further connected with a free-wheel mechanism F2, and can be immobilized via a further brake D. The internal gear of the basic drive 20 is connected with the planet carrier 16 of the group drive 10 and the sun gear 15 can be immobilized via brake G1 and can be connected via a clutch F10 and a free-wheel device H with the output shaft 18, which is connected with the internal gear of the group drive 10 and further has an inductive sensor 6 for the determination of the speed of rotation.

Figure 3:
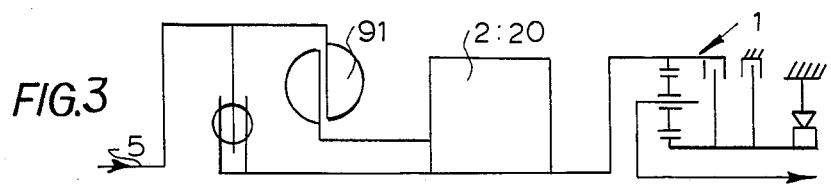
FIG. 3 is a diagram of the arrangement according to FIG. 1, but with a hydrodynamic clutch and a basic drive shown in simplified manner.

FIG. 3 is a further example of an implementation, where a basic drive 2, 20, as already described, is arrayed in series with a speed-reducing group drive 1 and a motor output shaft 5 is connected on the one hand via a hydrodynamic clutch 91, and on the other by a damping device, to the basic drive 2, 20.

Figure 4:
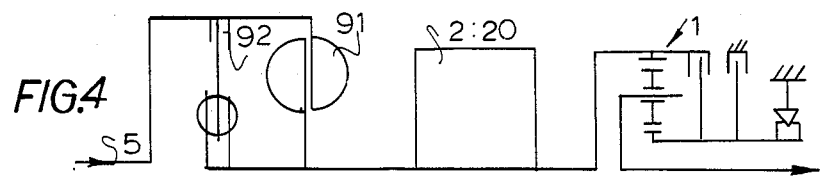
FIG. 4 is a diagram of the arrangement according to FIG. 3, but with a bypass clutch.

In FIG. 4 there is merely an additional bypass clutch 92 arrayed between the motor output shaft and the damper and the basic drive has only one input shaft, with which both the turbine of the hydrodynamic clutch and the damping device are connected.

Figure 5:
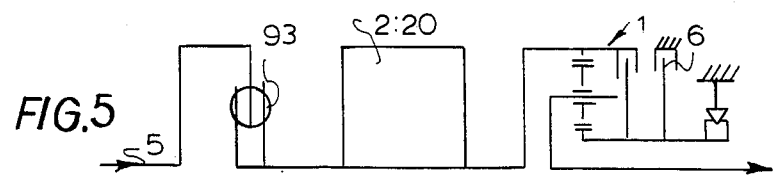
FIG. 5 is a diagram of the arrangement according to FIG. 4, but with a damping device between motor output shaft and basic drive.

FIG. 5 has between motor output shaft 5 and the basic drive 2, 20 only a damping device 93, where the brake G in group drive 1 is intended as accelerating device, and is laid out accordingly.

Figure 6:
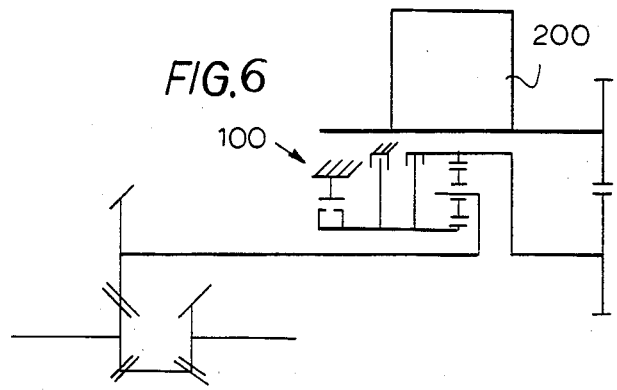
FIG. 6 is a diagram of an arrangement with parallel axes of a basic drive shown in simplified manner with a group drive, according to the invention.

In the arrangement according to FIG. 6 the basic drive 200 and the group drive 100 have parallel axes, so that an advantageous assembly into front wheel drive vehicles is made possible.

FIG. 7A to D shows in simplified representation, not to scale, the total gear ratio (speed) of gears one to four of a four-speed basic drive with a two-speed reducing group drive. The group drive with the gear ratio $\phi 85$ to $\phi 88$ is shifted only once, namely either FIG. 7A between the first and the second gear of the basic drive or FIG. 7B between the second and third gear of the basic drive or FIG. 7C between the third (direct) and the fourth (overdrive) gear of the basic drive or FIG. 7D after the fourth gear.

Thus the four-speed basic drive—with gears or speeds G.1, G.2, G.3, G.4 becomes a five-speed planet wheel speed change transmission having speeds or gears I to V.

Figure 7:
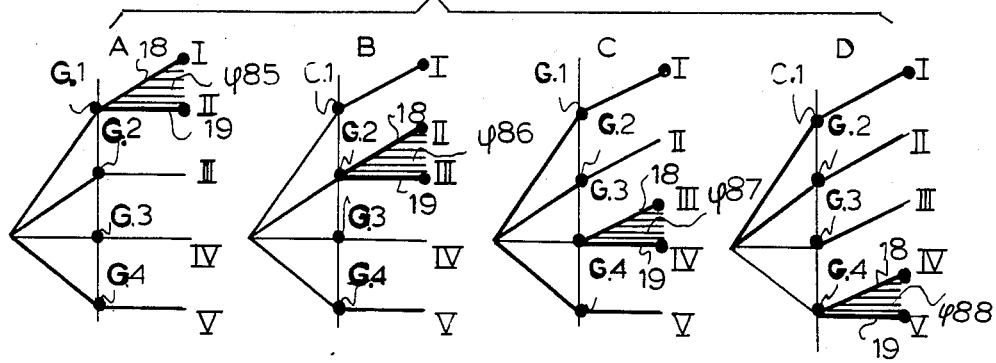
FIG. 7 is a group of diagrams showing positions of the shifted speeds of a speed-reducing group drive.
Figure 8:
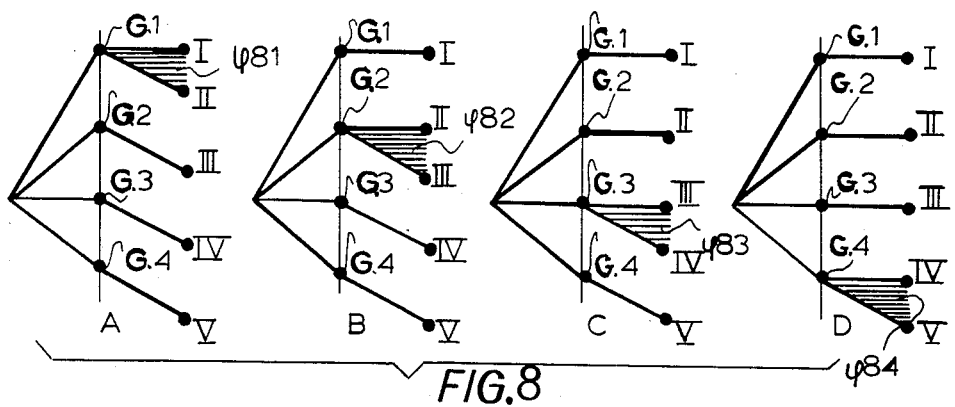
FIG. 8 is a view similar to FIG. 7, but with a speed-increasing group drive.

By way of example, for the five speeds of the set D for FIG. 7 and using the transmission of FIG. 1, the power flow is as follows:

First forward speed I.: Input via shaft 5, through torque-converter output shaft 21 to planetary 2. Clutch A is engaged. Planetary 23 freewheels at F2. Then via ring gear 13 to planet carrier 12 and output shaft 14. Clutches B, E, F are open. Brakes C, D and G are disengaged. Clutch A is engaged.

Second forward speed II.: Input via shaft 5, through torque-converter output shaft 21 to planetary 2. Clutch A and brake C are engaged. Then via ring gear 13 to planet carrier 12 and output shaft 14. Clutches B, E, and F are open. Brakes D and G are disengaged. Clutch A is engaged. Brake C is engaged.

Third forward speed III.: Input via shaft 5, through torque-converter output shaft 21 to planetary 2. Clutches A and E are engaged. Then via ring gear 13 to planet carrier 12 and output shaft 14. Clutches A, B and F are open. Brakes C, D and G are disengaged.

Fourth forward speed IV.: Input via shaft 5, through torque-converter output shaft 21 to planetary 2. Clutch E and brake C are engaged. Then via ring gear 13 to planet carrier 12 and output shaft 14. Clutches A, B and F are open. Brakes D and G are disengaged.

Fifth forward speed V.: Input via shaft 5, through torque-converter output shaft 21 to planetary 2. Clutch E and brake C are engaged. Then via ring gear 13 (clutch F being closed to couple the ruing gear 13 with sun gear 11) to planet carrier 12 and output shaft 14. Clutches A and B are open. Brakes D and G are disengaged.

Reverse: Input via shaft 5, through torque-converter output shaft 21 to planetary 2. Clutch B and brake D are engaged. Then via ring gear 13 to planet carrier 12 (sun gear 11 being braked by engagement of brake G) and output shaft 14. Clutches B, E, F are open. Brake is disengaged. Clutches A and E are engaged.

FIGS. 8A to 8D correspond in principle to FIGS. 7A to D, where however the gear ratios $\phi 81$ to $\phi 84$ cause speed increase.

Figure 9:
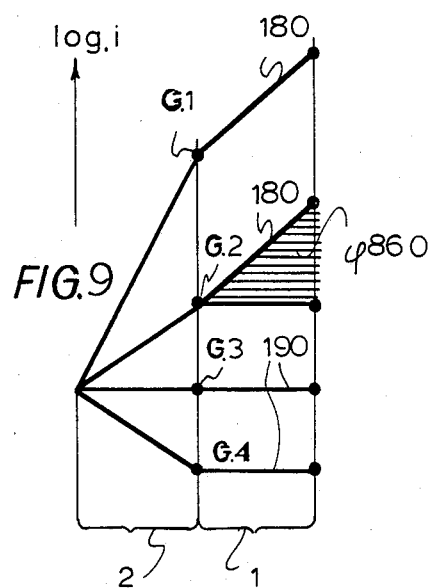
FIG. 9 is a diagram of the group and overall drive with one engaged gear of the speed-reducing group drive in conjunction with the second gear of the basic drive.
Figure 10:
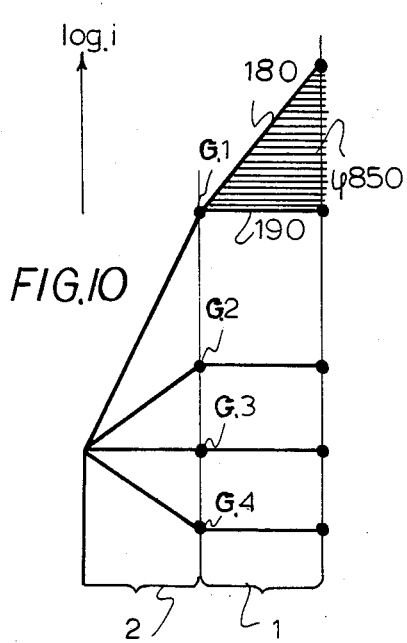
FIG. 10 is a representation according to FIG. 9, but with a speed-reducing basic drive, which is engaged in conjunction with the first gear of the first gear of the group drive.

FIGS. 9 and 10 are FIGS. 7B (FIG. 9) and 7A (FIG. 10), (shown) to scale, and incorporating gear ratios. The sequence of gear ratios to a four-speed transmission which functions as basic drive, decreasing in principle from the highest to the lowest gear, is easily recognizable, where however in actual practice the step-wise progression can only be attained in principle, due to the whole numbers of the gear teeth.

The overall speed (overall transmission ratio) of the extended transmission (speeds I to V) is subject to varying influences, depending on where the gear ratio $\phi 81$ to $\phi 84$ and $\phi 85$ to $\phi 88$ is instrumental. For a speed reducing (drive) the following conditions must be satisfied for the ratio in the group drive:

$$\phi 85 \geq i1/i2; i2/i3 \leq \phi 86 \leq i1/i2$$
$$i3/i4 \leq \phi 87 \leq i2/i3; \phi 88 \leq i3/i4$$

The group drive is inserted between the gears of the basic drive when it is speed-increasing, and the corresponding ratio meets the following conditions:

$$\phi 81 \geq i1/i2; i1/i2 \geq \phi 82 \geq i2/i3; i2/i3 \geq \phi 83 \geq i3/i4$$

We claim:

1. A planetary-gearing speed-change transmission having exclusively five forward speeds for a motor vehicle, comprising:
   a basic planetary gear transmission assembly with four forward speeds having:
   an input shaft connectable to a vehicle engine:
   main planetary gearing establishing first, second, third and fourth gear ratios corresponding to first, second, third and fourth forward speeds of the planetary-gearing speed-change transmission so that all forward speeds are developed through planetary gearing, said first forward speed corresponding to the highest speed-reduction ratio of the main planetary gearing;
   said second forward speed corresponding to a lower speed-reduction ratio than said first forward speed;
   said third forward speed corresponding to a lower speed-reduction ratio than said second forward speed and;
   said fourth forward speed corresponding to a lower speed-reduction ratio than said third forward speed;
   clutch and brake means operatively connected with said main planetary gearing and selectively operable to select one of said speeds by establishing the corresponding gear ratio of said main planetary gearing, and
   an output shaft connected to said main planetary gearing; and
   a planetary-gearing group drive connected in series with said four-speed basic planetary gear transmission assembly and generating selectively a fifth speed for said planetary-gearing speed-change transmission which is interposed between two of said first through fourth speeds so that said planetary-gearing speed-change transmission will have five speeds, said planetary-gearing group drive including:
   group-drive planetary gearing connected to said output shaft and providing the output of said planetary-gearing speed-change transmission, said group-drive planetary gearing being constructed and arranged to add a single gear ratio increment between said input shaft and the output of the planetary-gearing group drive exclusively for a single one of said first and second forward speeds which is at least equal to the gear ratio increment between said second and third gear ratios for the second and third speeds of said main planetary gearing, and said single gear ratio increment is at most equal to the gear ratio increment between said first and said second gear ratios, and
   means for actuating said group-drive planetary gearing to selectively add said gear ratio increment to a previously selected one of said first and second gear ratios.

2. The planetary-gearing speed-change transmission defined in claim 1, further comprising a hydrodynamic clutch between an engine shaft of said vehicle an said input shaft.

3. The planetary-gearing speed-change transmission defined in claim 1, further comprising a bypass clutch between said engine shaft and said input shaft.

4. The planetary-gearing speed-change transmission defined in claim 1 wherein said basic planetary-gear transmission and said group drive have parallel axes.

5. Said basic planetary-gear transmission assembly including A planetary-gearing speed-change transmission having five forward speeds for a motor vehicle, comprising:
   a basic planetary gear transmission assembly with four corresponding to the highest speed-reduction ratio of the main planetary gearing said second forward speed corresponding to a lower speed-reduction ratio than said first forward speed;
   said third forward speed corresponding to a lower speed-reduction ratio than said second forward speed and;
   said fourth forward speed corresponding to a lower speed-reduction ratio than said third forward speed, forward speeds having:
   an input shaft connectable to a vehicle engine:
   main planetary gearing establishing first, second, third and fourth gear ratios corresponding to first, second, third and fourth forward speeds of the planetary-gearing speed-change transmission so that all forward speeds are developed through planetary gearing,
   clutch and brake means operatively connected with said main planetary gearing and selectively operable to select one of said speeds by establishing the corresponding gear ratio of said main planetary gearing, and
   an output shaft connected to said main planetary gearing; and
   a planetary-gearing group drive connected in series with said four-speed basic planetary gear transmission assembly and generating selectively a fifth speed for said planetary-gearing speed-change transmission which is interposed between two of said first through fourth speeds so that said planetary-gearing speed-change transmission will have five speeds, said planetary-gearing group drive including:
   group-drive planetary gearing connected to said output shaft and providing the output of said planetary-gearing speed-change transmission, said group-drive planetary gearing being constructed and arranged to add a single gear ratio increment between said input shaft and the output of the planetary-gearing group drive which is at least equal to the gear ratio increment between said second and third gear ratios for the second and third speeds of said main planetary gearing, and said single gear ratio increment is at most equal to the gear ratio increment between said first and said second gear ratios, and selected one of said first and second gear ratios;

a torque converter having a pump and a turbine connected to an engine shaft of said motor vehicle, said torque converter being interposed between said engine shaft and a pair of input shafts to said main planetary gearing, means connecting a first of said input shafts selectively by clutches of said clutch-and-brake means to sun wheels of said main planetary gearing, brakes being provided and for selectively braking said first input shaft, means connecting said second input shaft through a clutch of said clutch and brake means with a planet carrier of said main planetary gearing, a free wheel device connected to said planet carrier, means including a further brake of said clutch and brake means being connected to selectively immobilize said planet carrier, and means for rigidly connecting ring gears of said main planetary gearing and of said group-drive planetary gearing together, said means for actuating said group-drive planetery gearing including a clutch for connecting said ring gears to a sun gear of said group-drive planetary gearing, said sun gear being further provided with a free wheel device and a brake.

6. Said basic planetary-gear transmission assembly comprises:

A planetary-gearing speed-change transmission having five forward speeds for a motor vehicle, comprising:

a basic planetary gear transmission assembly with four forward speeds having:

an input shaft connectable to a vehicle engine:

main planetary gearing establishing first, second, third and fourth gear ratios corresponding to first, second, third and fourth forward speeds of the planetary-gearing speed-change transmission so that all forward speeds are developed through planetary gearing, clutch and brake means operatively connected with said main planetary gearing and selectively operable to select one of said speeds by establishing the corresponding gear ratio of said main planetary gearing, and an output shaft connected to said main planetary gearing; and a planetary-gearing group drive connected in series with said four-speed basic planetary gear transmission assembly and generating selectively a fifth speed for said planetary-gearing speed-change transmission which is interposed between two of said first through fourth speeds so that said planetary-gearing speed-change transmission will have five speeds, said planetary-gearing group drive including:

group-drive planetary gearing connected to said output shaft and providing the output of said planetary-gearing speed-change transmission, said group-drive planetary gearing being constructed and arranged to add a single gear ratio increment between said input shaft and the output of the planetary-gearing group drive which is at least equal to the gear ratio increment between said second and third gear ratios for the second and third speeds of said main planetary gearing, and said single gear ratio increment is at most equal to the gear ratio increment between said first and said second gear ratios, and means for actuating said group-drive planetary gearing to selectively add said gear ratio increment to a previously selected one of said first and second gear ratios;

a torque converter connecting an engine shaft with said input shaft, a bypass clutch connecting said input shaft with said engine shaft, said input shaft being connected to a turbine of the torque converter, said clutch-and-brake means including clutches for selectively connecting said input shaft to a sun wheel of said main planetary gearing and to a planet carrier of said main planetary gearing, a brake of said clutch-and-brake means being connected through a free wheel device with said input shaft, and a further free wheel device connectable with said planet carrier, said planet carrier being adapted to be immobilized by a further brake of said clutch-and-brake means, said output shaft being connected to a planet carrier of said group-drive planetary gearing, the output of said speed-change transmission being connected to a ring gear of said group drive, a sun gear of said group drive being provided with a further clutch for selectively connecting same to said ring gear, said output shaft being connected to a ring gear of said main planetary gearing.

* * * * *